United States Patent
Keatch

(10) Patent No.: US 12,252,646 B2
(45) Date of Patent: Mar. 18, 2025

(54) COMPOSITIONS FOR THE DISSOLUTION OF CALCIUM NAPHTHENATE AND METHODS OF USE

(71) Applicant: BLUESKY ENVIRONMENTAL ENGINEERING LIMITED, Aberdeen (GB)

(72) Inventor: Richard William Keatch, Fife (GB)

(73) Assignee: BLUESKY ENVIRONMENTAL ENGINEERING LIMITED, Aberdeen (GB)

( * ) Notice: Subject to any disclaimer, the term of this patent is extended or adjusted under 35 U.S.C. 154(b) by 0 days.

(21) Appl. No.: 18/550,176

(22) PCT Filed: Mar. 16, 2022

(86) PCT No.: PCT/GB2022/050668
§ 371 (c)(1),
(2) Date: Sep. 12, 2023

(87) PCT Pub. No.: WO2022/195278
PCT Pub. Date: Sep. 22, 2022

(65) Prior Publication Data
US 2024/0166938 A1 May 23, 2024

(30) Foreign Application Priority Data
Mar. 16, 2021 (GB) .................................. 2103598

(51) Int. Cl.
*C09K 8/524* (2006.01)
*E21B 21/14* (2006.01)

(52) U.S. Cl.
CPC .............. *C09K 8/524* (2013.01); *E21B 21/14* (2013.01)

(58) Field of Classification Search
None
See application file for complete search history.

(56) References Cited

U.S. PATENT DOCUMENTS

| 2,032,825 A * | 3/1936 | Ambrose ............... C09K 8/516 507/263 |
| 3,402,770 A | 9/1968 | Messenger |
| 4,487,265 A | 12/1984 | Watanabe |
| 4,919,827 A | 4/1990 | Harms |
| 10,822,537 B2 * | 11/2020 | Quintero ................ E21B 37/06 |
| 2009/0149356 A1 | 6/2009 | Tiwari |

(Continued)

FOREIGN PATENT DOCUMENTS

| CA | 2638266 | 1/2010 |
| WO | WO2011159742 | 12/2011 |

(Continued)

OTHER PUBLICATIONS

International Search Report and Written Opinion were mailed on Jul. 1, 2022 by the International Searching Authority for International Application No. PCT/GP2022/050668 filed on Mar. 16, 2022 and published as WO 2022/195278 (Applicant: Richard Keatch) (10 pages).

*Primary Examiner* — John J Figueroa
(74) *Attorney, Agent, or Firm* — Ballard Spahr LLP

(57) ABSTRACT

Described is a composition and method of use for the dissolution of calcium naphthenate solids in the presence of water. The composition includes at least one carboxylic acid; and a mutual solvent that includes ethylene glycol monobutyl ether.

12 Claims, 1 Drawing Sheet

(56) References Cited

U.S. PATENT DOCUMENTS

| | | | |
|---|---|---|---|
| 2010/0029514 A1* | 2/2010 | Berry | C09K 8/52 |
| | | | 507/90 |
| 2012/0310022 A1* | 12/2012 | Khandekar | C09K 8/524 |
| | | | 564/456 |
| 2013/0210155 A1* | 8/2013 | Khandekar | C09K 8/524 |
| | | | 436/60 |
| 2017/0349841 A1 | 12/2017 | Grande et al. | |
| 2018/0079951 A1* | 3/2018 | Quintero | E21B 37/06 |
| 2019/0292436 A1 | 9/2019 | Mason et al. | |
| 2020/0199438 A1 | 6/2020 | Reiners et al. | |

FOREIGN PATENT DOCUMENTS

| | | |
|---|---|---|
| WO | WO2020055229 | 3/2020 |
| WO | WO2021041844 | 3/2021 |

* cited by examiner

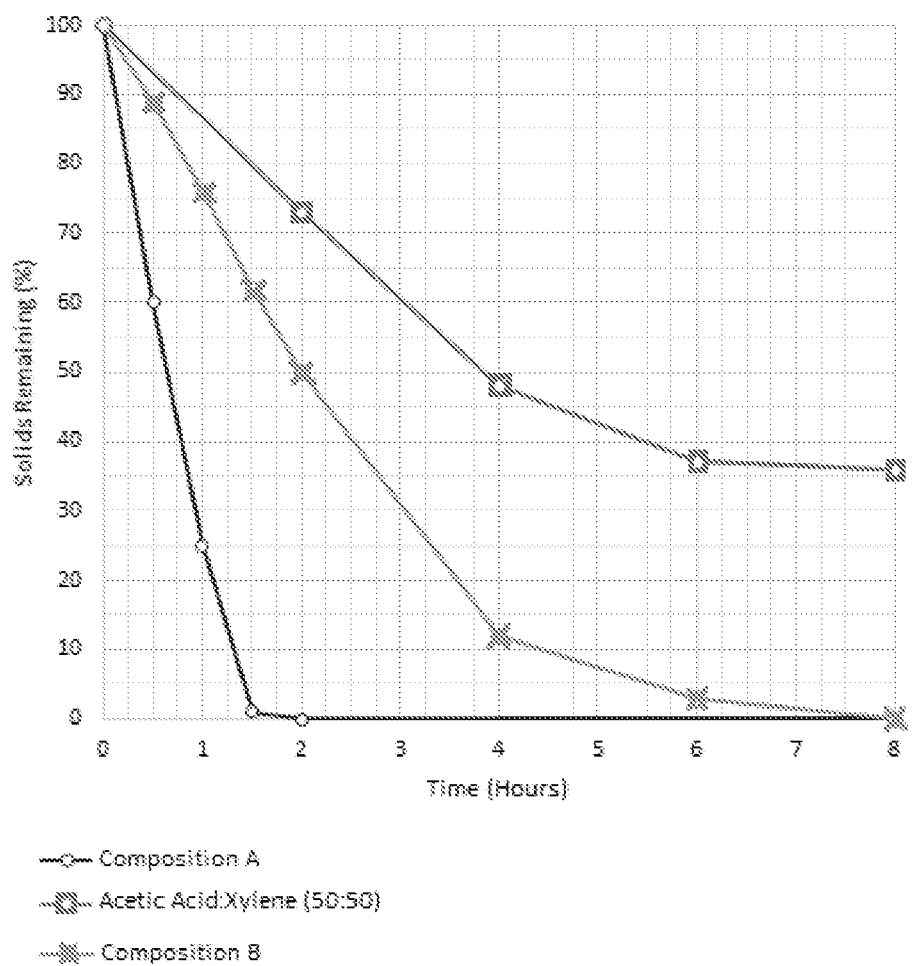

COMPOSITIONS FOR THE DISSOLUTION OF CALCIUM NAPHTHENATE AND METHODS OF USE

CROSS REFERENCE TO RELATED APPLICATIONS

This application is a U.S. National Phase Application of International Application No. PCT/GB2022/050668, filed Mar. 16, 2022, which claims priority to Great Britain Patent Application No. 2103598.5, filed Mar. 16, 2021, each of which are hereby incorporated by reference in their entirety.

The present invention relates to compositions and methods for dissolving deposits of calcium naphthenate, in particular to compositions and methods for dissolving solid deposits of calcium naphthenate in hydrocarbon wells and hydrocarbon production equipment. Aspects of the invention relate to treatments for downhole wells and topside production equipment.

BACKGROUND TO THE INVENTION

Crude oil comprises a liquid containing a mixture of thousands of different hydrocarbon compounds. Some of these compounds can cause problems during hydrocarbon production and processing operations. One problematic compound for instance is naphthenic acid and its salts. Naphthenic acid and its salts can precipitate as a solid when the naphthenic acids present in the crude oil mixes with calcium-rich produced water to form solid calcium naphthenate.

The naphthenic acids that are particularly problematic are those with a chain length of 80 carbon atoms. The long chains are hydrophobic and are soluble in the crude oil fraction but the C80 naphthenic acids also have four carboxylic acid groups at the chain terminals that are by contrast hydrophilic in nature.

Where there is a mixture of oil and water present in the produced fluids, the naphthenic acid molecules located at the oil-water interface orientate themselves in such a way that the hydrocarbon chains are immersed in oil whilst the carboxylic acid groups are immersed in the lower water layer and therefore have the potential to contact any dissolved divalent metal ions present in the water.

When the carboxylic acid groups are exposed to calcium ions for instance, they react to form calcium naphthenate which is a scale-like sticky solid material that can precipitate and plug perforations in the well-bore and adhere to production tubing and surface equipment involved in processing, thereby reducing the efficiency of crude oil production operations.

The mechanism of precipitation is affected by production conditions such as the drop of pressure experienced during processing which results in changing pH conditions and a drop in temperature.

The formation of calcium naphthenate can reduce production rates and adversely affect processing operations by blocking pumps and filters and forming floating and suspended solids that reduce the efficiency of oil-water separation.

Attempts to try to prevent the formation of naphthenic acid salts have been made involving the injection of inhibitors into crude oil and the injection of acid into produced water to lower the pH to reduce the tendency for calcium ions and naphthenic acid to form solid calcium naphthenate. Although these attempts have had limited success in specific instances, they require high concentrations of acid and chemical inhibitor to be effective. Further changes experienced in water production rates, changes in water chemistry and changes in naphthenic acid concentration can occur over time which requires constant monitoring and proactive changes in inhibition strategy to be made to avoid calcium naphthenate scale from forming.

The removal of calcium naphthenate deposits often involves the physical manual removal of solids by personnel entering vessels and manually digging out tons or tens of tons of deposit material. The manual removal of calcium naphthenate solids from valves and small-bore pipes with complicated configurations can be very difficult and involves the dismantling of equipment to access the deposits. Manual removal of calcium naphthenate deposits is a very time-consuming process that involves putting personnel into potentially hazardous working environments and is expensive due to lost production time.

SUMMARY OF THE INVENTION

It is an object of the present invention to obviate or at least mitigate the foregoing disadvantages of calcium naphthenate removal methods.

It is another object of an aspect of the present invention to provide a method of dissolving oilfield deposits of calcium naphthenate.

It is a further object of an aspect of the present invention to provide a treatment for downhole wells which can work quickly and remotely to dissolve calcium naphthenate deposits.

It is another object of an aspect of the present invention to provide a treatment for topside production equipment which can access small, restricted and inaccessible contaminated areas to remove calcium naphthenate solids.

It is another object of an aspect of the present invention to a provide chemical remedial treatment solution and methods of use which can quickly and efficiently dissolve calcium naphthenate solids in the presence of water.

Further aims of the invention will become apparent from the following description.

According to a first aspect of the present invention there is provided a composition for the dissolution of calcium naphthenate solids in the presence of water the composition comprising:
   at least one carboxylic acid; and
   a mutual solvent comprising ethylene glycol monobutyl ether.

The at least one carboxylic acid may be an alkali metal salt of carboxylic acid. The at least one carboxylic acid may be selected from the group comprising methanoic acid, ethanoic acid, propanoic acid, butyric acid; aromatic monocarboxylic acids, such as benzoic acid, phenylethanoic acid; aliphatic dibasic and oligocarboxylic acids, such as oxalic acid, propanedioic acid, succinic acid; oligocarboxylic acids; aminocarboxylic acids such as glycine; hydroxycarboxylic acids, such as glycolic acid, lactic acid, malic acid, tartaric acid, citric acid; aminopolycarboxylic acid such as nitrilotriacetic acid (NTA), ethylene diaminete traacetic acid (EDTA), di ethylene triamine pentaacetic acid (DTPA); and/or polyhydroxycarboxylic acids such as glucoheptonic acid.

The carboxylic acid may be selected to be compatible with the solvent and form calcium carboxylate salts that have a high level of solubility in water when exposed to naphthenic acid solids. Preferably the at least one carboxylic acid is ethanoic acid.

The ratio of carboxylic acid to mutual solvent may range from 5:95 to 95:5 by weight. The ratio of carboxylic acid to mutual solvent may be 30:70 by weight.

The composition may comprise xylene. The mutual solvent may comprise xylene. The mutual solvent may consist of ethylene glycol monobutyl ether. The ratio of carboxylic acid, mutual solvent and xylene may range from 5:90:5 to 45:10:45 by weight. The ratio of carboxylic acid, ethylene glycol monobutyl ether and xylene may range from 5:90:5 to 45:10:45 by weight.

The ratio of carboxylic acid, mutual solvent and xylene may be 30:50:20 by weight. The ratio of carboxylic acid, ethylene glycol monobutyl ether and xylene may be 30:50:20 by weight. The ratio of carboxylic acid, mutual solvent and xylene may be 30:40:30 by weight. The ratio of carboxylic acid, ethylene glycol monobutyl ether and xylene may be 30:40:30 by weight.

The composition may be formulated to be compatible with water at a particular mixing ratio or all mixing ratios.

The composition may be configured to be used for the dissolution of calcium naphthenate solids in an environment where water is present. The composition may be configured to be used for dissolution of calcium naphthenate solids in an environment where produced water is present.

The composition may be provided as a treatment for downhole wells, injection wells, hydrocarbon production equipment and/or topside process to dissolve calcium naphthenate solids. The composition may have a high dissolution capacity to dissolve all the deposit present in a one stage treatment.

The ethylene glycol monobutyl ether may be present in an amount which is sufficient to maintain the at least one carboxylic acid and the solvent as a single phase in the presence of water. The ethylene glycol monobutyl ether may be present in an amount which is sufficient to increase the flashpoint of the composition higher than ambient temperature of the location and/or equipment the composition is to be used. The composition may comprise at least 30 wt % ethylene glycol monobutyl ether. The composition may comprise at least 40 wt % ethylene glycol monobutyl ether.

The composition may have a flashpoint higher than ambient temperature of downhole wells, injection wells, hydrocarbon production equipment and/or topside process. The composition may have a flashpoint at least 5° C. higher than ambient temperature of downhole wells, injection wells, hydrocarbon production equipment and/or topside process. The mutual solvent may be configured to increase the flash point for the composition. The mutual solvent may be configured to increase the flash point for the composition between 1° C. to 20° C.

The inclusion of ethylene glycol monobutyl ether may be configured to increase the flash point for the composition. The inclusion of ethylene glycol monobutyl ether may increase the flash point for the composition between 1° C. to 5° C. The inclusion of ethylene glycol monobutyl ether may increase the flash point for the composition at least 5° C. The inclusion of ethylene glycol monobutyl ether may increase the flash point for the composition at least 10° C. The inclusion of ethylene glycol monobutyl ether may increase the flash point for the composition between 10° C. to 20° C.

According to a second aspect of the present invention there is provided a well treatment to dissolve calcium naphthenate solids; the treatment comprising:
ethanoic acid; and
a mutual solvent comprising ethylene glycol monobutyl ether (EGMBE).

The ratio of ethanoic acid to ethylene glycol monobutyl ether may be 30:70 by weight.

The composition may comprise xylene. The ratio of ethanoic acid, ethylene glycol monobutyl ether and xylene may range from 5:90:5 to 45:10:45 by weight.

The composition may be formulated to be compatible with water at a particular mixing ratio or all mixing ratios.

The ethanoic acid and ethylene glycol monobutyl ether may be in a single phase in the composition. The composition may be a single-phase acidic solvent.

The composition may be configured to be used for the dissolution of calcium naphthenate solids in a downhole environment where water is present. The composition may be configured to be used for dissolution of calcium naphthenate solids in an environment where produced water is present.

The composition may be compatible with downhole materials and/or downhole equipment such that the composition is not corrosive and does not damage equipment such as seals. Embodiments of the second aspect of the invention may include one or more features of the first aspect of the invention or its embodiments, or vice versa.

According to a third aspect of the present invention there is provided treatment for hydrocarbon production equipment to dissolve calcium naphthenate solids; the treatment comprising:
ethanoic acid; and a
a mutual solvent comprising ethylene glycol monobutyl ether.

The ratio of carboxylic acid to mutual solvent may range from 5:95 to 95:5 by weight.

The ratio of carboxylic acid to mutual solvent may be 30:70 by weight.

The composition may comprise xylene. The ratio of carboxylic acid, mutual solvent and xylene may range from 5:90:5 to 45:10:45 by weight.

The ratio of carboxylic acid, mutual solvent and xylene may be 30:50:20 by weight.

The ratio of carboxylic acid, mutual solvent and xylene may be 30:40:30 by weight.

The composition may be formulated to be compatible with water at a particular mixing ratio or all mixing ratios.

The composition may be configured to be used for the dissolution of calcium naphthenate solids on or in hydrocarbon production equipment in a topside or downhole environment where water is present. The composition may be configured to be used for dissolution of calcium naphthenate solids in an environment where produced water is present.

The composition may be compatible with the materials of hydrocarbon production equipment such that the dissolver is not corrosive and does not damage equipment such as seals.

Embodiments of the third aspect of the invention may include one or more features of the first or second aspects of the invention or their embodiments, or vice versa.

According to a fourth aspect of the present invention there is provided a method of dissolving calcium naphthenate solids in the presence of water; the method comprising:
providing a treatment composition comprising:
at least one carboxylic acid;
a mutual solvent comprising ethylene glycol monobutyl ether; and
exposing calcium naphthenate solids to the treatment composition.

The at least one carboxylic acid may be an alkali metal salt of carboxylic acid.

The at least one carboxylic acid may be selected from the group comprising methanoic acid, ethanoic acid, propanoic acid, butyric acid; aromatic monocarboxylic acids, such as benzoic acid, phenylethanoic acid; aliphatic dibasic and oligocarboxylic acids, such as oxalic acid, propanedioic acid, succinic acid; oligocarboxylic acids; aminocarboxylic acids such as glycine; hydroxycarboxylic acids, such as glycolic acid, lactic acid, malic acid, tartaric acid, citric acid; aminopolycarboxylic acid such as nitrilotriacetic acid (NTA), ethylene diaminete traacetic acid (EDTA), di ethylene triamine pentaacetic acid (DTPA); and/or polyhydroxycarboxylic acids such as glucoheptonic acid.

The at least one carboxylic acid may be selected to be compatible with the solvent and form calcium carboxylate salts that have a high level of solubility in water when exposed to calcium naphthenate solids. Preferably the at least one carboxylic acid is ethanoic acid.

The treatment composition may be a treatment fluid.

The ratio of carboxylic acid to mutual solvent may range from 5:95 to 95:5 by weight.

The ratio of carboxylic acid to mutual solvent may be 30:70 by weight.

The composition may comprise xylene. The ratio of carboxylic acid, mutual solvent and xylene may range from 5:90:5 to 45:10:45 by weight. The ratio of carboxylic acid, mutual solvent and xylene may be 30:50:20 by weight. The ratio of carboxylic acid, mutual solvent and xylene may be 30:40:30 by weight. The composition may be formulated to be compatible with water at a particular mixing ratio or all mixing ratios.

The method may comprise contacting naphthenic acid solids with the treatment composition. The method may comprise contacting calcium naphthenate solids with the treatment composition in the presence of water. The method may comprise contacting a mixture of calcium naphthenate solids and water with the treatment composition. The method may comprise contacting a mixture of calcium naphthenate solids and produced water with the treatment composition. The method may comprise applying the treatment compositions to calcium naphthenate solids.

The method may comprise dissolving the calcium naphthenate solids. The method may comprise contacting naphthenic acid solids with the treatment composition at ambient temperature.

The method may comprise the removal of calcium from the calcium naphthenate molecule.

The method may comprise using the carboxylic acid to remove calcium from the calcium naphthenate molecule.

The method may comprise forming naphthenate and an aqueous calcium salt.

The method may comprise forming solid naphthenate and an aqueous calcium salt.

The method may comprise converting solid naphthenate to liquid naphthenic acid.

The method may comprise blending the acid and solvent to form of a single-phase acidic solvent. The method may comprise solubilising the calcium and hydrocarbon components of the naphthenate solid using the treatment composition. The method may comprise solubilising the calcium and hydrocarbon components of the naphthenate solid using the single-phase acidic solvent.

The composition may be provided as a treatment for downhole wells, injection wells, hydrocarbon production equipment and/or topside process to dissolve calcium naphthenate solids.

Embodiments of the fourth aspect of the invention may include one or more features of any of the first to third aspects of the invention or their embodiments, or vice versa.

According to a fifth aspect of the present invention there is provided a method of treating a well to dissolve calcium naphthenate solids in the presence of water; the method comprising providing a treatment composition comprising:
ethanoic acid; and a
a mutual solvent comprising ethylene glycol monobutyl ether; and
pumping the treatment composition into a well.

The method may comprise dissolving calcium naphthenate solids present on downhole equipment and/or present in the formation.

The ratio of carboxylic acid to mutual solvent may range from 5:95 to 95:5 by weight.

The ratio of carboxylic acid to mutual solvent may be 30:70 by weight.

The method may comprise allowing the treatment composition sufficient time to dissolve the calcium naphthenate solids.

The method may comprise exposing the treatment composition for a period of at least 30 minutes. The method may comprise exposing the treatment composition for a period of at least 1 hour. The method may comprise exposing the treatment composition for a period of between 1 hour and 10 hours to dissolve the calcium naphthenate solids. The method may comprise exposing the treatment composition for a period of between 1 hour and 6 hours to dissolve the calcium naphthenate solids. The period of time may be dependent on the amount of deposit present and its thickness.

The method may comprise converting calcium naphthenate solids to naphthenic acid. The method may comprise exporting spent treatment composition with the produced crude oil. This may provide a more environmentally responsible disposal option.

Embodiments of the fifth aspect of the invention may include one or more features of any of the first to fourth aspects of the invention or their embodiments, or vice versa.

According to a sixth aspect of the present invention there is provided a method of treating a subterranean formation to increase injectivity into a reservoir comprising.
providing a well treatment composition comprising:
ethanoic acid; and
a mutual solvent comprising ethylene glycol monobutyl ether;
contacting the formation with the well treatment.

The method may comprise dissolving calcium naphthenate solids blocking or partially blocking pores in the formation.

Embodiments of the sixth aspect of the invention may include one or more features of any of the first to fifth aspects of the invention or their embodiments, or vice versa.

According to a seventh aspect of the present invention there is provided a method of treating hydrocarbon production equipment to remove calcium naphthenate solids; the method comprising providing a treatment composition comprising:
ethanoic acid; and a
a mutual solvent comprising ethylene glycol monobutyl ether;
introducing the treatment composition into and/or on the hydrocarbon production equipment.

The hydrocarbon production equipment may be surface hydrocarbon production equipment. The hydrocarbon production equipment may be sub-surface hydrocarbon production equipment. The hydrocarbon production equipment may comprise vessels.

The ratio of carboxylic acid to mutual solvent may range from 5:95 to 95:5 by weight.

The ratio of carboxylic acid to mutual solvent may be 30:70 by weight.

The composition may comprise xylene. The ratio of carboxylic acid, mutual solvent and xylene may range from 5:90:5 to 45:10:45 by weight. The ratio of carboxylic acid, mutual solvent and xylene may be 30:50:20 by weight. The ratio of carboxylic acid, mutual solvent and xylene may be 30:40:30 by weight. The composition may be formulated to be compatible with water at a particular mixing ratio or all mixing ratios.

The method may comprise allowing the treatment composition sufficient time to dissolve the calcium naphthenate solids. The method may comprise exposing the treatment composition for a period of at least 30 minutes. The method may comprise exposing the treatment composition for a period of at least 1 hour. The method may comprise exposing the treatment composition for a period of between 1 hour and 10 hours to dissolve the calcium naphthenate solids. The method may comprise exposing the treatment composition for a period of between 1 hour and 6 hours to dissolve the calcium naphthenate solids. The period of time may be dependent on the amount of deposit present, its thickness and the capacity of the contaminated vessel.

The method may comprise pumping out the spent treatment composition leaving no undissolved deposit after treatment.

Embodiments of the seventh aspect of the invention may include one or more features of any of the first to sixth aspects of the invention or their embodiments, or vice versa.

According to an eighth aspect of the present invention there is provided a composition for the dissolution of calcium naphthenate solids in the presence of water the composition comprising:
  at least one carboxylic acid; and
  a mutual solvent comprising ethylene glycol monobutyl ether;
  wherein the composition comprises at least 30 wt % ethylene glycol monobutyl ether to maintain the composition as a single phase in the presence of water.

The at least one carboxylic acid may be an alkali metal salt of carboxylic acid. The at least one carboxylic acid may be selected from the group comprising methanoic acid, ethanoic acid, propanoic acid, butyric acid; aromatic monocarboxylic acids, benzoic acid, phenylethanoic acid; aliphatic dibasic and oligocarboxylic acids, oxalic acid, propanedioic acid, succinic acid; oligocarboxylic acid; aminocarboxylic acid, glycine; hydroxycarboxylic acids, glycolic acid, lactic acid, malic acid, tartaric acid, citric acid; aminopolycarboxylic acid nitrilotriacetic acid (NTA), ethylene diaminete traacetic acid (EDTA), di ethylene triamine pentaacetic acid (DTPA); polyhydroxycarboxylic acids, and/or glucoheptonic acid.

The composition may comprise at least 40 wt % ethylene glycol monobutyl ether to maintain the composition as a single phase in the presence of water. The composition may form calcium carboxylate salts soluble in water when exposed to naphthenic acid solids. The ratio of carboxylic acid to mutual solvent may be in the range of 10:90 to 60:40 by % weight. The ratio of carboxylic acid to mutual solvent may be 30:70 by % weight.

The composition may comprise xylene. The ratio of carboxylic acid, mutual solvent and xylene may range from 5:90:5 to 30:40:30 by % weight. The ratio of carboxylic acid, mutual solvent and xylene may be 30:40:30 by weight.

The composition may be compatible with water at all mixing ratios. The composition may be provided as a treatment to dissolve calcium naphthenate solids in or on downhole wells, injection wells, a formation, hydrocarbon production equipment, downhole equipment, tubulars, surface equipment, topside process equipment and/or a vessel.

The mutual solvent may be configured to increase the flash point for the composition. The ethylene glycol monobutyl ether may be configured to increase the flashpoint of the composition higher than ambient temperature of the location and/or equipment the composition is to be used. The inclusion of ethylene glycol monobutyl ether may increase the flash point for the composition between 1° C. to 5° C. The composition may have a flashpoint at least 5° C. higher than ambient temperature of downhole wells, injection wells, hydrocarbon production equipment and/or topside process. The inclusion of ethylene glycol monobutyl ether may increase the flash point for the composition at least 10° C. The inclusion of ethylene glycol monobutyl ether may increase the flash point for the composition between 10° C. to 20° C. The mutual solvent and/or ethylene glycol monobutyl ether may be configured to increase the flash point for the composition between 1° C. to 20° C.

Embodiments of the eighth aspect of the invention may include one or more features of any of the first to seventh aspects of the invention or their embodiments, or vice versa.

According to a ninth aspect of the present invention there is provided a method of dissolving calcium naphthenate solids in the presence of water; the method comprising:
  providing a treatment composition comprising:
  at least one carboxylic acid; and
  a mutual solvent comprising ethylene glycol monobutyl ether;
  wherein the composition comprises at least 30 wt % ethylene glycol monobutyl ether; and
  exposing calcium naphthenate solids to the treatment composition.

The method may comprise contacting calcium naphthenate solids with the treatment composition in the presence of water. The method may comprise contacting a mixture of calcium naphthenate solids and produced water with the treatment composition.

The method may comprise contacting naphthenic acid solids with the treatment composition at ambient temperature. The method may comprise forming solid naphthenate and an aqueous calcium salt.

The composition may comprise at least 30 wt % ethylene glycol monobutyl ether to maintain the composition as a single phase in the presence of water and/or increase the flashpoint of the composition higher than ambient temperature of the location and/or equipment the composition is to be used.

The composition may comprise at least 40 wt % ethylene glycol monobutyl ether to maintain the composition as a single phase in the presence of water. The composition may comprise at least 40 wt % ethylene glycol monobutyl ether to maintain the composition as a single phase in the presence of water and/or increase the flashpoint of the composition higher than ambient temperature of the location and/or equipment the composition is to be used.

The method may comprise converting solid naphthenate to liquid naphthenic acid. The method may comprise solubilising the calcium and hydrocarbon components of the naphthenate solid using the single-phase composition. The method may comprise contacting the treatment composition with naphthenic acid solids in or on downhole wells, injection wells, a formation, hydrocarbon production equipment, downhole equipment, tubulars, surface equipment, topside process equipment and/or a vessel.

The method may comprise pumping the treatment composition into a well to dissolve calcium naphthenate solids in a well. The method may comprise exposing calcium naphthenate solids to the treatment composition for a period of at least 30 minutes to dissolve the calcium naphthenate solids.

The method may comprise exposing the treatment composition for a period of at least 1 hour. The method may comprise exposing the treatment composition for a period of between 1 hour and 10 hours to dissolve the calcium naphthenate solids. The method may comprise exposing the treatment composition for a period of between 1 hour and 6 hours to dissolve the calcium naphthenate solids. The period of time may be dependent on the amount of deposit present and its thickness.

The method may comprise exporting spent treatment composition with produced oil.

The method may comprise contacting the treatment composition with naphthenic acid solids in or on a subterranean formation to dissolve calcium naphthenate solids blocking or partially blocking pores in the subterranean formation.

Embodiments of the ninth aspect of the invention may include one or more features of any of the first to eighth aspects of the invention or their embodiments, or vice versa.

According to a tenth aspect of the present invention there is provided a composition for the dissolution of calcium naphthenate solids in the presence of water the composition comprising:
at least one carboxylic acid; and
a mutual solvent comprising ethylene glycol monobutyl ether;
wherein the ethylene glycol monobutyl ether is present in an amount which is sufficient to increase the flashpoint of the composition higher than ambient temperature of the location and/or equipment the composition is to be used.

The composition may comprise at least 30 wt % ethylene glycol monobutyl ether. The composition may comprise at least 30 wt % ethylene glycol monobutyl ether to maintain the composition as a single phase in the presence of water and increase the flashpoint of the composition higher than ambient temperature of the location and/or equipment the composition is to be used. The composition may comprise at least 40 wt % ethylene glycol monobutyl ether. The composition may comprise at least 40 wt % ethylene glycol monobutyl ether to maintain the composition as a single phase in the presence of water and increase the flashpoint of the composition higher than ambient temperature of the location and/or equipment the composition is to be used.

The ratio of carboxylic acid to mutual solvent may be in the range of 10:90 to 60:40 by % weight. The ratio of carboxylic acid to mutual solvent may be 30:70 by % weight.

The composition may comprise xylene. The ratio of carboxylic acid, mutual solvent and xylene may range from 5:90:5 to 30:40:30 by % weight. The ratio of carboxylic acid, mutual solvent and xylene may be 30:40:30 by weight.

Embodiments of the tenth aspect of the invention may include one or more features of any of the first to ninth aspects of the invention or their embodiments, or vice versa.

According to an eleventh aspect of the present invention there is provided a method of dissolving calcium naphthenate solids in the presence of water using any of the compositions according to the first, second, third, eighth and/or tenth aspects of the invention.

Embodiments of the eleventh aspect of the invention may include one or more features of any of the first to tenth aspects of the invention or their embodiments, or vice versa.

BRIEF DESCRIPTION OF THE DRAWINGS

FIG. 1 is a graph illustrating the dissolution rate of solid Calcium Naphthenate samples obtained from a floating production system. Samples where static soaked in different dissolver compositions at 35° C. in the presence of 10% produced water.

DESCRIPTION OF THE PREFERRED EMBODIMENTS

In an embodiment of the invention there is provided a treatment fluid of carboxylic acid and a mutual solvent comprising ethylene glycol monobutyl ether for the dissolution of calcium naphthenate solids in the presence of water.

The treatment fluid penetrates and reacts with the outer exposed surface of the solid mass of calcium naphthenate solids. The carboxylic acid dissolves the surface exposed calcium ions. As the calcium ions are removed the naphthenic acids are dissolved in the mutual solvent allowing fresh treatment fluid to contact the newly exposed surface of the calcium naphthenate.

The treatment fluid is a combination of a carboxylic acid and ethylene glycol monobutyl ether solvent which is a hydrocarbon solvent blended to form a single-phase acidic solvent. The treatment fluid solubilises both the calcium and hydrocarbon components of the calcium naphthenate solid and has a high tolerance to water. The treatment fluid may be used in the presence of water and maintain high dissolution rates.

The treatment fluid may be used in the presence of produced water from reservoir formations where there may be a high level of dissolved salts, without the salts precipitating out from the water on mixing with the treatment fluid.

Calcium naphthenate salts usually form at the oil/water interface and as they form, they entrain a significant amount of produced water within the solid matrix itself to a greater or lesser extent depending on the physical form of the calcium naphthenate. Calcium naphthenate in the field can present itself in a variety of forms ranging from particulate and granular deposits to stringy strands to solid lumps and other forms that may consist of the same calcium naphthenate but differ in the amount of produced water entrained within the matrix. The occurrence of the different physical forms and their differing water contents are largely dependent on the conditions prevailing at a particular location in the crude oil processing system where parameters including temperature, pH, mixing and flow which affect the resulting form of calcium naphthenate.

The density of calcium naphthenate solids formed usually has a value between that of crude oil and produced water that causes them to float on water and sink in oil and occupy the oil: water interface where water and crude oil are present. In different parts of the processing system there is the likelihood that large quantities of water will remain following incomplete drainage of the system.

As an example, in a processing system separator has a tank with a wall or weir, positioned approximately two-thirds along its length. Production fluids including oil, water and gas entering the separator will be separated on the basis of the different specific gravities of the components. Gas having the lowest specific gravity can be separated by an outlet pipe exiting the ceiling of the separator. Water having the highest density can be separated by an outlet pipe on the bottom the separator upstream of the wall whilst the crude oil sitting on top of the water will flow over the weir and can be collected from an outlet pipe positioned downstream on the other side of the weir. Some calcium naphthenate solids present may travel over the weir with the oil, however, most calcium naphthenate solids are trapped behind the weir, depending on the level of the oil/water interface in the separator.

Following shutdown there can be a significant amount of produced water that cannot be completely drained from the upstream side of the weir in the separator as a large quantity of calcium naphthenate solids block the outlet pipes. In this instance and other locations there is a high potential for water to be trapped following draining the system. The treatment fluid is capable of effectively dissolving calcium naphthenate in an environment where both solid calcium naphthenate and produced water is present.

The invention will be further illustrated by the following examples. These examples are included to demonstrate the use of the fluid treatment compositions in accordance with embodiments of the present invention. Various modifications to the described examples may be made within the scope of the invention.

Example 1

Secondary oil recovery techniques often involve the injection of seawater and the reinjection of produced water into the reservoir to maintain the reservoir pressure as oil is removed from it to maximise the recovery of oil from the reservoir. Whilst the produced water undergoes separation processes and filtration to remove any calcium naphthenate solids, it is likely that very small molecules will either pass through the filters or more likely that calcium ions and naphthenic acid present in produced water will pass through the filter and then combine to form micron sized particles of calcium naphthenate that can, over time, partially block the pores in the formation and reduce injectivity.

The application of a hydrocarbon solvent-acid system for this water injection well application ideally comprises a solvent system which is completely compatible with water at all mixing ratios.

In this injection well example the suitable treatment composition blend is ethanoic acid and ethylene glycol monobutyl ether is a blend of 70% EGMBE and 30% ethanoic acid has a flashpoint of 61° C. and is soluble at all mixing ratios with water. The composition is capable of dissolving 20 μm calcium naphthenate particles within 20 minutes of exposure at 20° C.

Example 2

At topside locations remedial treatment is required where large quantities of calcium naphthenate solids form and need to be dissolved quickly and efficiently to allow production operations to be restarted.

In some of these topside locations the contamination consists predominantly of calcium naphthenate solids and only a relatively small amount of water is present. In this instance the goal is to use a treatment fluid blend which has a high tolerance to water and allows a large quantity of calcium naphthenate to be dissolved whilst remaining in a single phase. Another important consideration is to use a treatment fluid that has a flashpoint higher than the ambient conditions of temperature.

Topside production systems typically require large quantities of calcium naphthenate to be rapidly and completely dissolved by the treatment fluid. The levels of contamination experienced can be in excess of 50 tonnes of calcium naphthenate in process equipment with a volume of 100 m$^3$ by which time processing operations can become severely compromised necessitating remedial treatment. The treatment fluid needs to have a high dissolution capacity towards calcium naphthenate and requires the calcium naphthenate to be dissolved very rapidly to minimise the amount of oil production down time. Critical to the treatment fluid performance is the ability to function in the presence of water.

In this topside treatment fluid example, a suitable treatment fluid blend of 30% ethanoic acid, 40% EGMBE and 30% xylene is very effective at dissolving a field sample of calcium naphthenate solids. The treatment fluid completely dissolved a 2.5 g lump of calcium naphthenate in 50 mls of the treatment fluid at 20° C. under static conditions in 2 hours.

The partially spent treatment fluid formed a clear amber brown solution. In a separate dissolution capacity experiment 100 mls of the same treatment fluid was able to solubilise 150 g of the same calcium naphthenate solids. The addition of EGMBE at this level allowed 30% water to be absorbed into the solution without any separation of phases. The additional and unexpected advantage of combining the EGMBE and xylene solvents was an increase in flashpoint which for xylene was found to be 27° C. but with the addition of EGMBE was raised to 36° C.

As a comparison a calcium naphthenate sample was treated with a blend of methanol:xylene:ethanoic acid at a mixing ratio of 40:30:30. The methanol:xylene:ethanoic acid mix separated into two phases after 20 g of the calcium naphthenate solids had been dissolved by the 100 mls of solution. the methanol:xylene:ethanoic acid was only able to dissolve 50 g/100 mls of calcium naphthenate.

Example 3

Another topside treatment fluid example blend involving the same components with an EGMBE:xylene:ethanoic acid ratio at 50:20:30 resulted in a further increase in flashpoint to 41° C. but the dissolution rate was found to be approximately 20% slower than the 40:30:30 EGMBE:xylene:ethanoic acid blend of Example 2.

The invention provides a composition for the dissolution of calcium naphthenate solids in the presence of water the composition comprising carboxylic acid and a mutual solvent comprising ethylene glycol monobutyl ether.

The inclusion of ethylene glycol monobutyl ether improves the performance of the dissolution of calcium naphthenate solids under field conditions where water is a significant factor affecting solubilisation. The inclusion of EGMBE in the composition efficiently dissolves wet calcium naphthenate solids both in terms of a rapid dissolution rate and in particular providing a solution with a very large dissolution capacity. The inclusion of EGMBE unexpectedly significantly increases the flashpoint of the composition mixture from 27° C. to 36° C. or over 41° C. depending on the mixing ratio of EGMBE and xylene.

Compatibility with Water 50 ml solutions of Composition A (30% ethanoic acid, 40% EGMBE and 30% xylene), Composition B (50% Acetic Acid, 50% EGMBE) and a reference composition (acetic acid:xylene 50:50 blend) were each placed in measuring cylinders and 0.5 ml aliquots of water added.

The reference composition (acetic acid:xylene 50:50 blend) mix was able to take up 1 ml of water and remain in a single phase, at 1.5 mls the solution became hazy and started to separate resulting in two liquid layers. In contrast Composition A and Composition B dissolvers both remained as single-phase clear solutions.

Calcium naphthenate solids form where produced water and crude oil mix. The ability of Composition A and Composition B to remain in a single phase facilitates dissolution of Calcium naphthenate solids in the presence of water.

In contrast, the acetic acid:xylene acid composition in contact with water splits into two separate phases with the lower density xylene sitting as a discreet layer on top of the acetic acid layer. Calcium Naphthenate will only be in contact with one phase or the other resulting in a decrease in dissolution rate. The acetic acid:xylene composition would require that virtually all the produced water in the system was removed before treatment to avoid reduced dissolution rate.

Compatibility with Production Water

A second test was performed where 10 g Calcium Naphthenate solids together with an amount of produced water comprising 10% of the volume of the dissolver solutions (50 mls) was added to see the effect of the additional water on the effectiveness of the various dissolver solutions. The dissolver solutions used were as above: Composition A (30% ethanoic acid, 40% EGMBE and 30% xylene), Composition B (50% Acetic Acid, 50% EGMBE) and a reference composition (acetic acid:xylene 50:50 blend).

As shown in FIG. 1, the additional water had a marked deleterious effect on the performance of the acetic acid: xylene blend which separated quickly, and the dissolution rate plateaued at a level where approximately a third of the Calcium Naphthenate Solids remained undissolved. The ability of the acetic acid:xylene blend to dissolve the Calcium Naphthenate solids was compromised by the presence of a small quantity of produced water.

Composition A and Composition B were compatible with the production water present at this level and dissolved all the calcium naphthenate solids added. Composition A and Composition B dissolved the Calcium Naphthenate solids efficiently and after dissolution the solution remained clear with no residue. The dissolution rate is fast at room temperature but can be further increased by warming the solution and providing agitation by circulating the dissolver. The performance of Composition A and Composition B was not compromised by the presence of produced water as these compositions remained as a single-phase solution.

The composition of embodiments of the invention may provide a treatment fluid that can quickly and efficiently dissolve calcium naphthenate solids in the presence of water. As a result, these treatment fluids can be used in field applications in downhole wells and topsides production equipment without requiring calcium naphthenate solids to be dried or the water context to be reduced before treatment.

Optionally, the spent calcium naphthenate dissolver composition containing dissolved calcium naphthenate may be treated to remove potentially undesirable contents from solution by utilizing the compatibility with water characteristics of the dissolver composition. The carefully balanced single phase composition in the presence of water may be treated to disrupt that balance to help with the disposal of the spent dissolver by making the components of the composition separate into layers thereby allowing selective removal or isolation of certain components and minimising the amount of chemical that is required to be disposed. In a spent or partially spent dissolver, where calcium is present as a water soluble calcium carboxylate salt and the naphthenic acid is present in the hydrocarbon solvent, it may be possible to treat the spent dissolver to form two discreet layers. The discreet layers may be an upper layer containing both xylene and naphthenic acid which can be exported in the crude oil and a lower discreet aqueous layer containing acetic acid, calcium carboxylate salt, mutual solvent and water which can be discarded, optionally by reinjection into a well. The reinjection of the acidic water phase may provide an additional benefit in utilizing any unused acetic acid to lower the pH of the formation water thereby, over time, reducing the potential to form calcium naphthenate deposits and minimizing the amount of acid required to be added topside to minimize scale formation by inhibition. The presence of naphthenic acids in the produced fluids may provide a benefit to the process of refining of crude oil.

The composition of embodiments of the invention may have advantages over physical removal techniques in that it can work remotely and is able to access the smallest most restricted inaccessible contaminated areas of the well and production equipment. The treatment fluids of the embodiments of the invention are not susceptible to phase separation which increases their dissolution capacity and dissolution rate.

The foregoing description of the invention has been presented for purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention as defined by the appended claims.

The invention claimed is:

1. A method of dissolving calcium naphthenate solids in the presence of water; the method comprising:
   providing a treatment composition comprising:
   at least one carboxylic acid; and
   a mutual solvent comprising ethylene glycol monobutyl ether;
   wherein the composition comprises at least 30 wt % ethylene glycol monobutyl ether;
   and exposing calcium naphthenate solids to the treatment composition.

2. The method according to claim 1 comprising contacting calcium naphthenate solids with the treatment composition in the presence of water.

3. The method according to claim 1 comprising contacting a mixture of calcium naphthenate solids and produced water with the treatment composition.

4. The method according to claim 1 comprising contacting naphthenic acid solids with the treatment composition at ambient temperature.

5. The method according to claim 1 forming solid naphthenate and an aqueous calcium salt.

6. The method according to claim 5 comprising converting solid naphthenate to liquid naphthenic acid.

7. The method according to claim 5 comprising solubilising the calcium and hydrocarbon components of the naphthenate solid using the single-phase composition.

8. The method according to claim 1 comprising contacting the treatment composition with naphthenic acid solids in or on downhole wells, injection wells, a formation, hydrocarbon production equipment, downhole equipment, tubulars, surface equipment, topside process equipment and/or a vessel.

9. The method according to claim 1 comprising pumping the treatment composition into a well to dissolve calcium naphthenate solids in a well.

10. The method according to claim 1 comprising exposing calcium naphthenate solids to the treatment composition for a period of at least 30 minutes to dissolve the calcium naphthenate solids.

11. The method according to claim 1 comprising exporting spent treatment composition with produced oil.

12. The method according to claim 1 comprising contacting the treatment composition with naphthenic acid solids in or on a subterranean formation to dissolve calcium naphthenate solids blocking or partially blocking pores in the subterranean formation.

* * * * *